No. 645,862. Patented Mar. 20, 1900.
J. M. K. LETSON & F. W. BURPEE.
FISH CUTTING MACHINE.
(Application filed Feb. 2, 1899.)
(No Model.) 4 Sheets—Sheet 1.
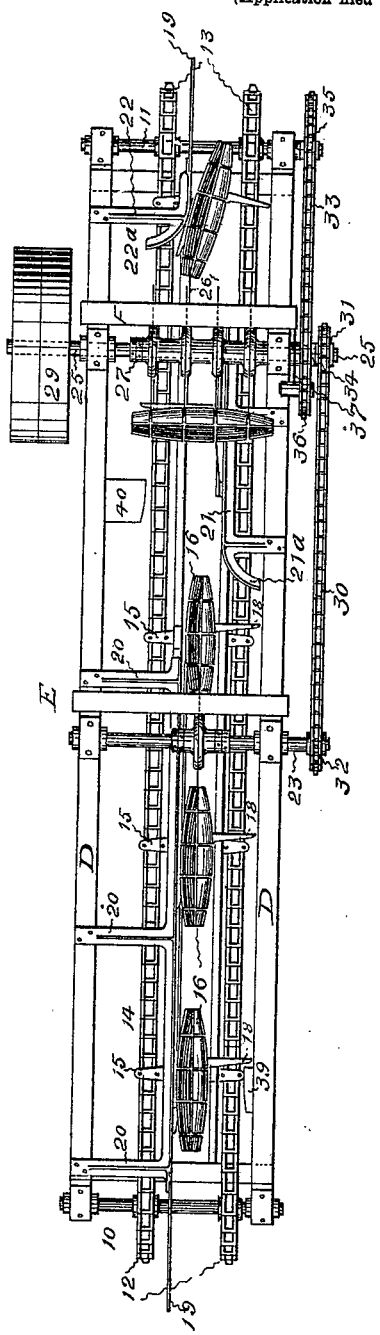
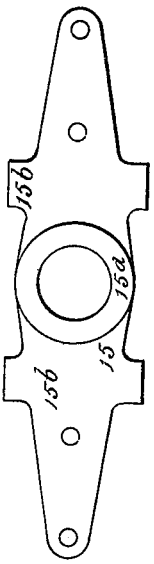
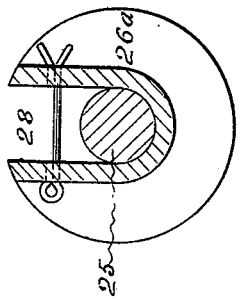
WITNESSES.
Rowland Brittain
Louis Kershaw
INVENTORS.
James M. K. Letson
Frank W. Burpee
By W. T. ...
Attorney
THE NORRIS PETERS CO., PHOTO-LITHO., WASHINGTON, D. C.

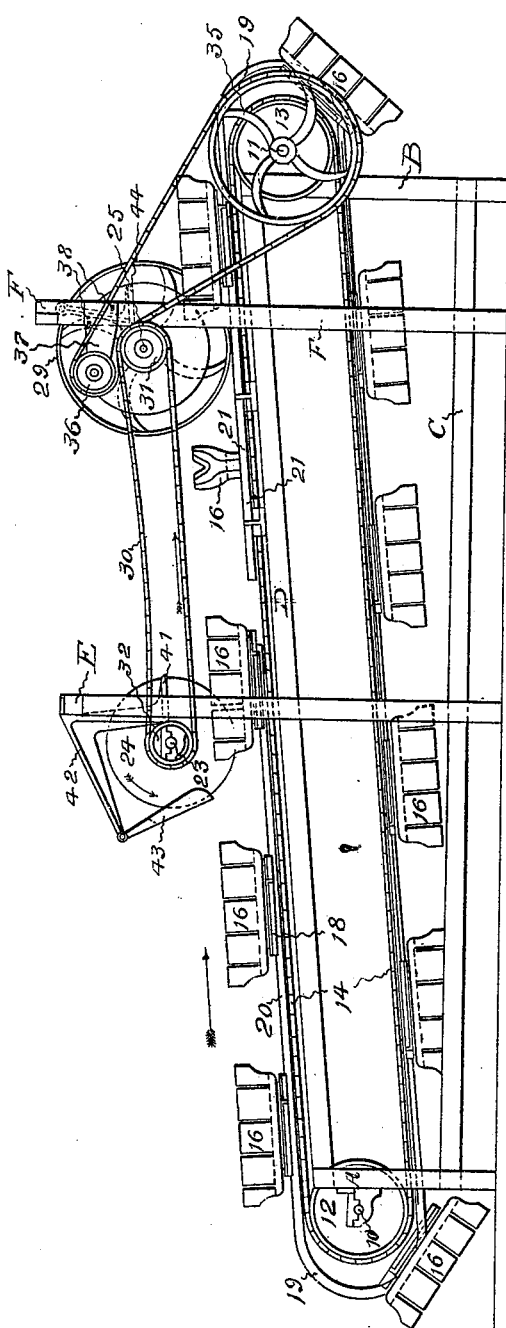

No. 645,862. Patented Mar. 20, 1900.
J. M. K. LETSON & F. W. BURPEE.
FISH CUTTING MACHINE.
(Application filed Feb. 2, 1899.)

(No Model.) 4 Sheets—Sheet 3.

WITNESSES.
Rowland Brittain
Louis Kershaw

INVENTORS.
James M. K. Letson
Frank W. Burpee
By N. F. Brittain attorney

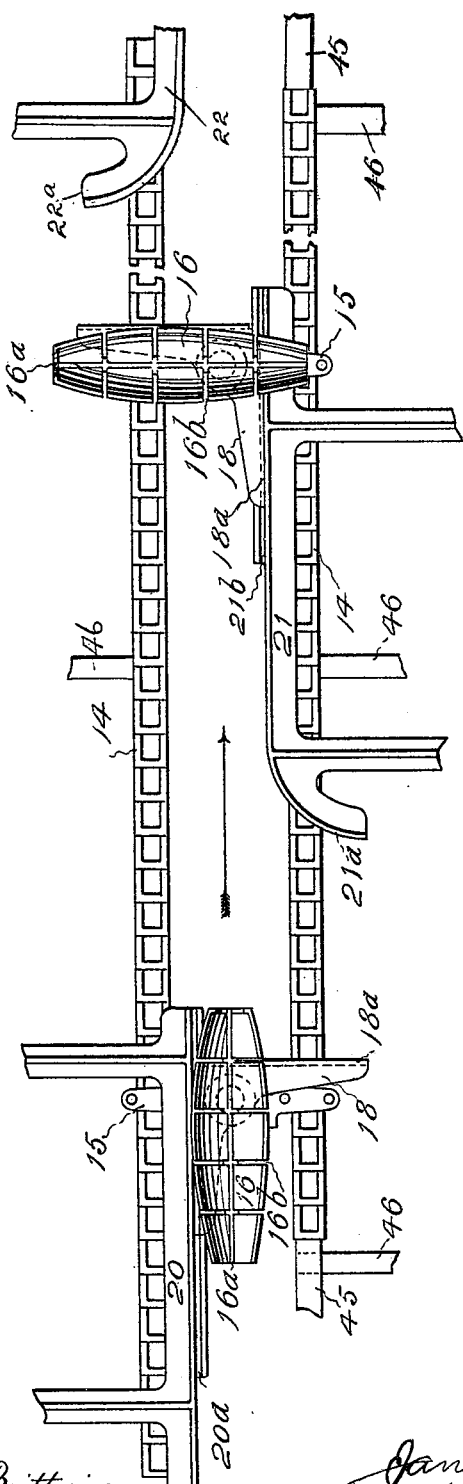

UNITED STATES PATENT OFFICE.

JAMES MOORE K. LETSON AND FRANK WATTS BURPEE, OF VANCOUVER, CANADA.

FISH-CUTTING MACHINE.

SPECIFICATION forming part of Letters Patent No. 645,862, dated March 20, 1900.

Application filed February 2, 1899. Serial No. 704,231. (No model.)

*To all whom it may concern:*

Be it known that we, JAMES MOORE K. LETSON and FRANK WATTS BURPEE, citizens of the Dominion of Canada, residing at Vancouver, in the Province of British Columbia, Canada, have invented certain new and useful Improvements in Fish-Cutting Machines, of which the following is a specification.

Our invention relates to improvements in machines for splitting or dividing fish and also for cutting the fish transversely after being split into the proper dimensions for being adequately filled into cans in which receptacles for holding the fish are arranged on an endless belt or belts taking over a suitable bed beneath revolving cutting-disks; and our objects are to provide a machine that will split the fish as they are carried forward in an endwise position and turn their holding-receptacles at right angles to a plurality of moving knife-disks arranged on the same plane in respect to the bed as the splitting-disk, and thereby to cut the said fish in the desired lengths, and, further, to provide a machine for splitting or cutting only, as the particular case demands. We attain these objects by the mechanism illustrated in the accompanying drawings, in which—

Figure 3:
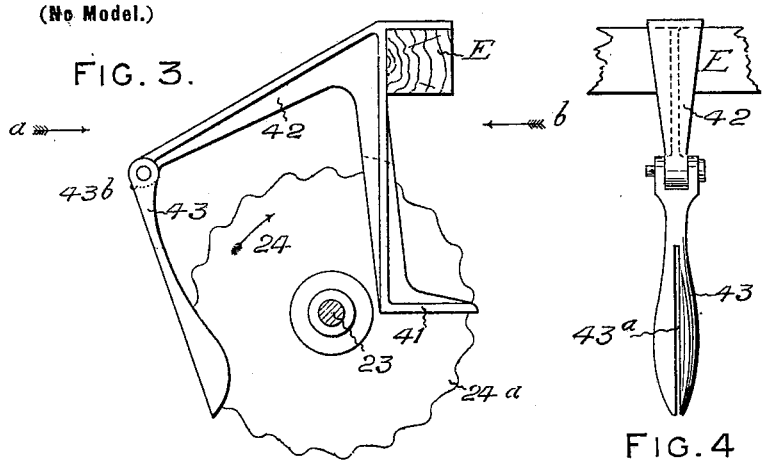
Figures 4, 5:
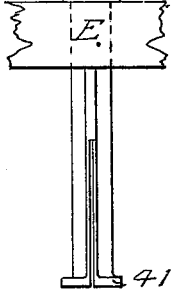
Figure 6:
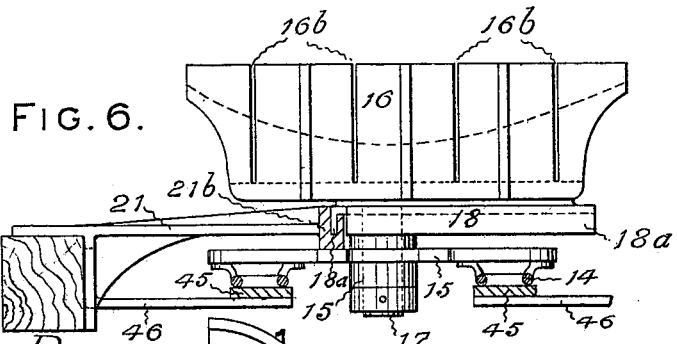
Figure 7:
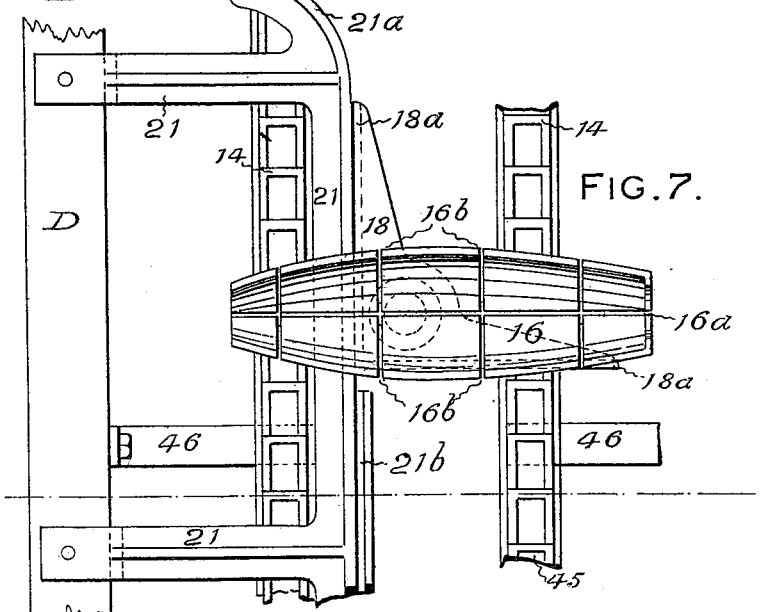

Figure 1 is a plan of our machine. Fig. 2 is an elevation of the same, taken in the direction of the arrow in Fig. 1. Fig. 3 is an enlarged side view of the splitting-disk, the guide for opening or parting the bellies of the fish, and the guard for preventing fragments from being carried around on the disk. Fig. 4 is a front view of the guide from the direction of the arrow marked $a$; and Fig. 5 is a view from the opposite direction, as indicated by the arrow marked $b$. Fig. 6 is an enlarged detail elevation of one of the fish-carrying receptacles, its carrier or support, and the mechanism for controlling the turning movement of said receptacles. Fig. 7 is a plan of the same. Fig. 8 shows a sectional detail of the distance-sleeves between the cutting-disk. Fig. 9 is a detailed plan of one of the yokes 15, and Fig. 10 is an enlarged detailed plan of the conveying devices and the mechanism for turning and guiding the fish-holding receptacles 16.

The legs A and B, the horizontal pieces C, and the sloping portions D constitute the chief portions of the frame of our machine, these being fitted and strongly bolted together.

Suitably journaled in bearings fixed to the legs or uprights A and B are shafts 10 and 11, respectively, and securely mounted on these shafts are wheels 12 and 13, the said wheels in this case being arranged in pairs at a suitable distance apart. Taking around the wheels 12 and 13 are chain belts 14, and connecting these chains together at regular intervals are yokes 15. Each of these yokes is provided at its center with a boss $15^a$. (See Figs. 6 and 9.) Supported by the yokes 15 and having studs passing through the apertures in the bosses thereon are receptacles 16 for receiving the fish to be cut or split, the said studs being held in place by collars 17, fixed on their lower ends, which project below the bosses $15^a$. Directly beneath and in proximity to and integral with the bottoms of the receptacles 16 are right-angled guide-pieces 18, these having their outer sides machined and projected downward, as at $18^a$, (shown in Fig. 6,) and each of the receptacles 16 is provided with a longitudinal slot or passage $16^a$ and transverse slots $16^b$ for a reason to appear hereinafter.

As better shown in Fig. 1, a fence 19 is provided on the rear side and along the under side of the bed, this being arranged to engage the outer sides of the right-angled pieces 18, which lie parallel with the fish-receptacles 16, as at $18^a$. For a distance on the upper side of the bed this fence 19 is substituted by a frame 20, which is rigidly fixed to the rear sloping frame D, the rear end of said frame 20 ending approximately to the center or half-way over the bed. On the opposite side or front of the bed is fixed a frame 21, similar in form to the frame 20. This extends farther rearward over the major part of the bed not occupied by the frame 20, and on the forward end of this latter frame 21 is a cam $21^a$, the object of which will be understood presently. A little rearward of the termination of the frame 21 the fence 19 is again commenced on the opposite side of the bed, the said fence being secured at this point to a frame 22, rigidly fixed to the rear frame D, as shown. This frame 22, which is the commencement of the fence 19, is provided with a cam 22$^a$ for engaging the sides of the right-angled pieces 18, which traverse the frame 20, and whereby the receptacles 16 are returned to a lengthwise position, as shown in the forward part of the machine.

Suitably journaled in bearings fixed to an upright frame E above the bed and over the rear end of the frame 20 is a shaft 23. On this shaft 23 is secured a cutting-disk 24, the same being placed in direct alinement with the longitudinal slots or channels 16$^a$ in the receptacles 16, through which the said cutter is passed.

Arranged on the same plane as the shaft 23 with respect to the bed of the machine and journaled in suitable bearings fixed to a frame F is a shaft 25, which is placed approximately over the rear end of the frame 21, which frame, as before mentioned, is placed on the opposite side of the bed to the frame 20. Securely fixed at regular intervals on the shaft 25 are cutting-disks 26, similar to the disk 24. These disks 26 are held apart by distance-sleeves 26$^a$, and the assembled disks and sleeves are securely held on the shaft by jam-nuts 27, turned up tight on each side of the same. As better shown in Fig. 8, these distance-sleeves 26$^a$ are made to slip on and off the shaft 25 without the necessity of removing the disks. Especially is this advantageous in case it is desired to change the dimension of the receptacles 16 and supply holders for dividing the fish into various lengths for filling cans of various depths or lengths. In this event the pins 28 are removed, the sleeves 26 are slipped off the shaft, and sleeves of the required size are substituted therefor, so that the cutter-disks will be arranged the proper distances apart to pass between the transversely-placed slots 16$^b$ in the fish-carrying receptacles 16.

Movement is imparted to a pulley 29, rigidly fixed on the shaft 25, and a chain belt 30, taking over a pulley 31 on the opposite end of the said shaft and over a pulley 32, fixed on the shaft 23, communicates movement thereto in the direction of the arrow. The belt 14, carrying the yokes 12 over the bed, is driven in an opposite direction to the belt 30 and at a much slower speed by a belt 33, having its lower side taking over a pulley 34, fixed on the shaft 25, and taking around a larger pulley 35, fixed on the shaft 11, and over an idler 36, arranged on a bracket 37. This bracket 37 is secured to the outer front side of the frame F by bolts 38, passing therethrough and through slots in said bracket. The slots in said bracket 37 allow of the belt 33 being tightened or adjusted to properly grip the sprocket-teeth on the wheel 34.

As better shown in Figs. 1 and 2, the receptacles 16, which hold the fish, are caused to be passed over the major part of the bed in an endwise position, they being held in such position by the fence 19 engaging the outer sides of the angled guide-pieces 18, that lie parallel with the said receptacles. As the right-angled pieces 18 come to the frame 20 the depending edges 18$^a$ will be received in a groove 20$^a$ therein during the passage beneath the rotating cutter-disk 24, and thus the said receptacles 16 will receive such cutter fairly in the slot or groove 16$^a$, which cutter will divide each fish down the center.

Rigidly fixed to the inner side of the front frame D on the opposite side from the frame 20 is a cam or guide 39, which is arranged to extend to the path of the front ends of the yoke 15, and as each of the said yokes come to this point the cam or guide 39 will press it over against the frame 20 and will insure that the depending sides 18$^a$ of each of the right-angled pieces 18 will be properly entered in the groove 20$^a$, which groove will prevent the receptacles 16 from having any lateral movement while the cutter-disk 24 is passing through the receptacles, and consequently dividing the fish therein. As the said receptacles 16 pass forward the opposite forks of the right-angled pieces 18 will be engaged by the cam 21$^a$ on the frame 21. (See Figs. 1 and 7.) This will throw the fish-receptacles at right angles and hold them so while passing beneath the revolving cutter 26, and thus the fish will be cut the desired lengths, and as a farther point is reached the forks of the right angles lying parallel with the receptacles will be engaged by the cam 22$^a$ on the frame 22, which will return the said receptacles to their original lengthwise positions and passed onward in such condition beneath the bed.

As shown in Figs. 6 and 7 of details, the grooves 20$^a$, receiving the planed depending edges of the right-angled pieces, as 18$^a$, are illustrated in the details of the frame 21, which is in this respect an exact duplicate of the frame 20, except that it is shorter and is arranged on the front side of the path of the fish-carrying receptacles and designed to engage the fork of the right-angled piece that is at right angles to its respective receptacles, the groove in this being indicated by 21$^b$. The depending edge of each of the frames or right-angled pieces 18 is caused to be guided into the groove 21$^b$ by the opposite end of its respective yoke 15 being pressed forward by the cam 40 on the rear frame D in a similar manner to the entrance of the opposite depending edge of the right-angled pieces 18 into the groove 20$^a$ on the front part of the machine.

As better shown in Figs. 2 and 3, we provide a cleaner 41, which lies over the rising side of the revolving cutter-disk 24 and is secured to the cross-frame E. This cleaner is for preventing fragments of the fish from adhering to the disk, and thus interfering with the splitting of the fish. The upper part of the frame having the cleaner 41 is provided with a projecting portion 42, which slopes forward in front of a perpendicular tangent with the front periphery of the disk 24.

Hinged to this projecting portion 42 is a depending arm 43, having a slot 43ª cut therein to receive the cutter-disk 24. This depending arm is gradually tapered off on opposite sides and terminating in a wedge at its bottom having the slot or slit 43ª therein for receiving the cutter-disk or knife 24. Although the said arm 43 may be pushed forward by any rigid pressure that may be brought against it, it cannot return to a perpendicular position by reason of a stop in the hinge 43ᵇ, which holds the arm in a forwardly-sloping manner.

The fish-bodies are placed with their bellies upward in the receptacles 16 and with their thick parts advancing toward the cutter 24, and as they pass along the arm 43 will part the bellies, so that the cutter will divide them down the center and prevent the possible mutilation of the sides of the bellies, which would sometimes occur if they were not properly parted for the cutting-disk. Cleaning devices 44 are employed over the rotating disks 26 to keep the said blades free from fragments of the cut fish, these being similar to the cleaners 41 over the disk 24. (See dotted lines in Fig. 2.)

For facilitating the cutting of the fish the edges of the disks are preferably made of irregular or corrugated surfaces, as 24ª in Fig. 3, an edge of this kind being conceded to have more cutting capacity than one having the plain smooth surface.

As shown in Fig. 6, we provide bearers 45 for supporting the belts 14. These bearers extend along at the proper distance below the top of the bed, so as to cause the fish-carrying receptacles to travel on an even plane for the entire length of the machine, and these bearing-bars are supported by arms 46, which are rigidly fixed to the opposite frames D.

To hold the yokes 15 firmly, so that the receptacles 16 will be carried forward beneath the cutting-disks 26 in a rigid manner without danger of being tipped by the action of the same in cutting the fish, we provide that the upper surfaces of said yokes bear against the under sides of the frame 21 directly beneath the slot 21ᵇ, and such surfaces of the yokes at this point are widened, as at 15ᵇ, to give an adequate bearing-surface against the lower side of the said frame 21. This gives ample stability to the forward movement of the said receptacles 16, although they are merely attached by the yokes to chain belts, as shown in Fig. 6, the bearing being from three points—namely, the bearings 45, the frame 21, and the depending edge 18ª of the right-angled piece 18 in the slot of groove 21ᵇ.

The receptacles 16 while passing over the frame 20 and beneath the cutter-disk or knife 24 are held in the same rigid position by being received on the opposite side between the said frame 20 and the bearers 45 and the depending tongue or edge on the opposite side of the right-angled piece 18 taking through the slot 20ª, as before mentioned.

The belts 14, carrying the receptacles 16, are prevented from sagging beneath the bed by the yokes being supported on bearers 70 while returning beneath the bed, which are similar to the bearers 45.

It is evident from the construction of the invention that by removing the rear cutting-disk 26 it may be employed for splitting the fish only. This change will be found very important where the fish are being prepared for salt or dry curing, and it is further obvious that the receptacles may be made the dimensions and form for handling various kinds and sizes of fish.

In the practical operation of our invention the machine is put in motion by the means as before mentioned, the fish, after first having been cleaned, are placed in the receptacles with their bellies upward and their thick or head portions toward the cutting-disk 24, which as they pass along will divide them down the center. At a farther point the lateral projecting arms of the right-angled pieces 18 will be engaged by the cam 21ª on the frame 21. This will turn the fish-receptacle containing the divided fish at right angles, while the disk 26 will pass through the slots 16ᵇ and thus cut the fish in pieces. As the receptacle passes on it will be returned to a lengthwise position, and as it passes beneath the bed the cut fish will fall therefrom into a suitable receptacle beneath.

Although the fish-holding receptacles 16 have been specially designed to hold the fish during the operation of cutting or splitting, it has been anticipated by us that the receptacles will conveniently hold the fish during a cleaning operation, as well as the cutting, without making any change in the form thereof.

Having thus described our invention, what we claim, and desire to be protected in by Letters Patent, is—

1. In a fish-cutting machine having a suitable bed and fish-cutting disks arranged thereover, chain belts arranged parallel and taking around wheels at opposite ends of the bed, yokes 15 secured to said chains at intervals, bearers 45 for supporting the chains or belts on a plane just below the upper side of the bed, a fence 19 passing beneath the bed, a frame 20 connecting with the said fence and supported by arms connecting with the rear side of the bed-frame D, and a groove 20ª in the outer upper side of the frame 20, in combination with fish-carrying receptacles 16 pivoted on the yokes 15, right-angled pieces 18 integral with the said receptacles having their outer edges depending, one downwardly-depending angle of which is received in the said groove 20ª in the frame 20, and the downwardly-depending edge of the other side of the angle is received in a groove 21ᵇ in a frame 21 on the opposite side of the bed at a point to the rear of the frame 20, whereby the said receptacles are first passed for a distance over the bed lengthwise and then are turned at right angles thereto and passed along in that position, for the purposes specified.

2. In a machine for the purposes set forth having a suitable bed, belt-wheels mounted on opposite ends thereof, and belts taking around the same, yokes connecting the belts together at intervals, bosses on said yokes, fish-holding receptacles 16 pivotally arranged on said bosses and right-angled pieces 18 integral with said receptacles, fixed frames 21 and 22 on the opposite sides of the path of the said receptacles for engaging the right-angled pieces for holding the receptacles lengthwise for a distance over the bed and for turning and holding them at right angles to the same for a distance thereover, in combination with a rotating cutter 24 mounted on a shaft 23 over the path of the receptacles while in a lengthwise position and a plurality of rotating cutters 26 mounted on a shaft 25 over the bed at the point where the receptacles 16 are passed along at right angles to the bed.

3. In a fish-cutting machine having a bed with belts taking thereover and cutting-disks arranged in frames E and F a suitable distance above the bed, yokes 15 secured to the belts and connecting them together at intervals, bosses in said yokes, fish-holding receptacles pivoted or movably secured in apertures in said yokes, turning devices 18 integral with the said receptacles, which consist of right-angled pieces having their edges projected downward, as at $18^a$, and fixed frames 20 and 21 arranged on opposite sides of the track of the fish-holding receptacles, and grooves $20^a$ and $21^a$ in said frames for receiving the downwardly-projected edges of the right angles 18, as specified.

4. In a machine of the class described, having a bed, wheels mounted at each end thereof, and a belt or belts 14 taking therearound, a cutting-disk 24 arranged over the bed and a plurality of like cutting-disks 26 arranged over near the rear end of the bed and at approximately the same plane as the disk 24 with respect to the bed, and means for imparting a high speed to the disks 24 and 26 and a slower speed to the belts 14, in combination with fish-holding receptacles 16 secured in a pivotal manner to yokes connecting the said chains 14 together and right-angled pieces 18 secured beneath and integral with the said receptacles, of a fence 19 passing beneath the bed for engaging one of the sides on each of the angle-pieces 18, and controlling the fish-holding receptacles in a lengthwise position, and a frame 20 having a groove $20^a$ connecting with the fence 19 and extending beneath the cutting-disk 24 and a frame 21 on the opposite side of the bed, having a cam $21^a$ for engaging the other side of each of the right-angled pieces, and for turning the fish-holding receptacles, and groove $21^a$ in said frame for holding them so while being passed beneath the cutting-disk 26, and a cam $22^a$ on a frame supporting the rear end of the fence for engaging said angle-pieces, as and for the purposes set forth.

5. A machine of the class described having a bed with wheels mounted at each end thereof and belts taking therearound, bearers 45 for supporting the upper side of the belts on an even plane while passing over the bed, and frames 20 and 21 arranged diagonally from each other on each side of the bed and extending over the said belts the under sides of these frames 20 and 21 being on an even plane, and grooves $20^a$ and $21^b$ on the upper sides of the same, a frame 22 in line with the frame 20 and connected therewith by a fence 19 passing beneath the bed and cams $21^a$ and $22^a$ on the frames 21 and 22 respectively, yokes 15 connecting the belts together at intervals, fish-holding receptacles arranged in bosses on the yokes, which receptacles have right-angled members which engage in the grooves $20^a$ and $21^b$ alternately by means of the said cams $21^a$ and $22^a$ engaging the right-angled members, and widened or flattened portions $15^b$ on the opposite sides of the bosses on the upper surface of the yokes, which engage the under sides of the plane surfaces of the frames 20 and 21 alternately and respectively.

6. In a machine of the class described in combination with a rotary cutting-disk 24 secured on a shaft 23 suitably mounted in a frame, a biforked arm 41 lying on opposite sides of the said cutting-disk, the said forks having horizontal portions which act as cleaners for the disk, and a depending, movable arm 43 pivoted to a forwardly-projecting arm 42 integral with the biforked arm 41, said arm 43 being tapered and divided by a slot $43^a$ substantially as and for the purposes set forth.

7. In a machine for splitting and cutting fish and means of adjusting a plurality of cutting-disks 26 at various distances apart upon a shaft without removing same, consisting of distance-sleeves $26^a$ having openings on their sides for receiving the said shaft and pins 28 for holding them on said shaft on each side of the cutting-disks, substantially as and for the purposes set forth.

JAMES MOORE K. LETSON.
FRANK WATTS BURPEE.

Witnesses:
ROWLAND BRITTAIN,
GEO. E. KYLE.